United States Patent [19]  [11] 4,442,386
Uchida et al.  [45] Apr. 10, 1984

[54] CONTROL APPARATUS OF TRANSISTOR MOTOR

[75] Inventors: Ryohei Uchida; Tatsuo Yamasaki; Toshio Idei, all of Nagaokakyo; Toshio Tatsutani; Ippei Hagiwara, both of Nakatsugawa, all of Japan

[73] Assignee: Mitsubishi Denki Kabushiki Kaisha, Tokyo, Japan

[21] Appl. No.: 462,203

[22] Filed: Jan. 31, 1983

[30] Foreign Application Priority Data

Feb. 10, 1982 [JP] Japan ................... 57-21526

[51] Int. Cl.$^3$ ............................................ H02K 29/00
[52] U.S. Cl. .................................... 318/254; 318/439
[58] Field of Search ................... 318/138, 254, 254 A, 318/439

[56] References Cited

U.S. PATENT DOCUMENTS 3,891,904 6/1975 Pollmeier ........................... 318/254
4,344,023 8/1982 Yokobori et al. ................... 318/254
4,368,411 1/1983 Kidd ................................... 318/254

OTHER PUBLICATIONS

E. K. Persson, "Brushless Low Inertia Motors", IEE Pub. 136, pp. 31–34 (1976).

Primary Examiner—G. Z. Rubinson
Assistant Examiner—Bentsu Ro
Attorney, Agent, or Firm—Lowe, King, Price & Becker

[57] ABSTRACT

A control apparatus of a transistor motor comprises an addition reference setting circuit (203), a positive voltage addition circuit (204 and 207), a negative voltage addition circuit (205), and a positive/negative voltage addition circuit (202). The addition reference setting circuit (203) is adapted to produce reference values VC and VD. The addition is made of the magnitude of the positive-going component with respect to the reference value VC out of the peak values of the feedback voltages (VU, VV and VW) in the positive voltage addition circuit, whereby the output VAA is provided. Addition is also made of the magnitude of the negative going component with respect to the reference value VD out of the peak values of the feedback voltages in the negative voltage addition circuit, whereby the output VB is provided. The above described outputs VAA and VB are added to each other in the positive/negative voltage addition circuit, whereby the output VE is provided. The output voltages of the hall-effect devices ($\alpha$, $\beta$ and $\gamma$) are controlled such that the magnitude of the output VE may be consistent with the magnitude of the control signal (VF) in a difference control circuit (209 and 201). Accordingly, it was confirmed that a torque ripple of the motor is drastically mitigated.

16 Claims, 16 Drawing Figures

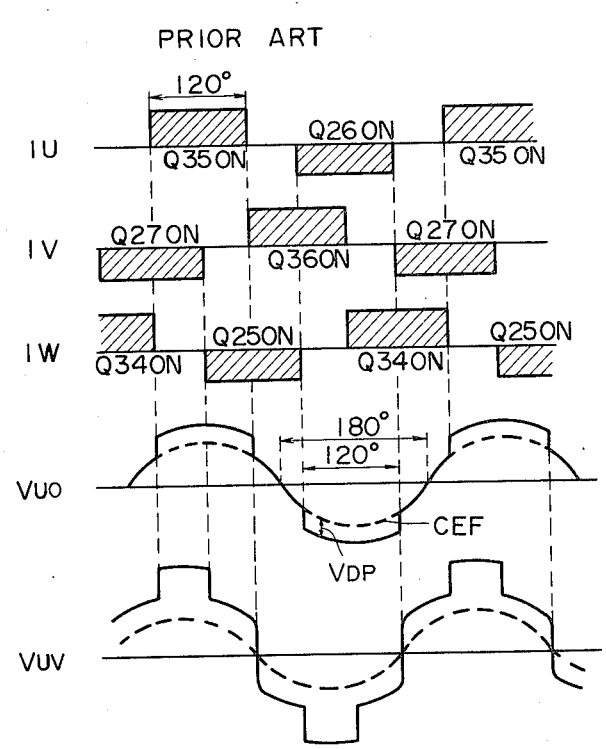

CONTROL APPARATUS OF TRANSISTOR MOTOR

BACKGROUND OF THE INVENTION

1. Field of the Invention

The present invention relates to a control apparatus of a transistor motor. More specifically, the present invention relates to a control apparatus of a transistor motor for performing a smooth rotation by suppressing a torque ripple.

2. Description of the Prior Art

In the case of a transistor motor for use in audio equipment, video tape recorder or the like and having a permanent magnet as a magnetic field source of a rotor, the performance of such product is influenced by vibration and noise incidental to rotation of the rotor and among others a rotation irregularity is a most important factor. Since a rotation irregularity, i.e. a torque ripple, occurring when a rotational force is transmitted to a permanent magnet of a rotor as a function of a current flowing through an armature coil provided on a stator is a largest factor giving rise to a rotation irregularity, it is imperative to mitigate a torque ripple in this type of motor.

Conventionally an approach was employed in such transistor motor in which a hall-effect device is employed as a rotor position detecting means and control is made such that the output of the hall-effect device is as such power amplified to be applied to an armature coil or a current proportional to the output of the hall-effect device is caused to flow through an armature coil. This approach is referred to as a linear type and FIG. 1 shows one example of a control circuit for employing such type. Referring to FIG. 1, the outputs from hall-effect devices $\alpha$, $\beta$ and $\gamma$ are linearly amplified by operational amplifiers P1 to P3 and transistors Q1 to Q6, respectively, so that the outputs are applied to armature coils $u_1$, $u_2$, $v_1$, $v_2$, $w_1$ and $w_2$ of a transistor motor. According to this approach, a first formula of $\sin^2\theta + \cos^2\theta = 1$ is utilized in case of the two-phase and a second formula of $\sin^2\theta + \sin^2(\theta - 120°) + \sin^2(\theta - 240°) = 3/2$ is utilized in the case of the three-phase, whereupon the motor is driven so that no torque ripple occurs in principle. In such case, the hall-effect devices of position sensors used as control elements of the same number as that of the phase are provided for the purpose of control; however, it is usual that there is a difference between the amplitudes of the output voltages of the respective hall-effect devices due to diversification of the quality of such products even when the input conditions of such hall-effect devices are the same. Thus a torque ripple occurs unless such amplitude difference is corrected. Accordingly, this conventional approach requires a gain adjusting means for equalizing the levels of the respective phases as to the outputs of the hall-effect devices or the voltages applied to the armature coils. The FIG. 1 example employs variable resistors VR1 and VR2 as a gain adjusting means.

Another control approach often employed is the one in which the output of the position sensors are used after conversion to logical signals. For example, in the case of a three-phase motor, a so-called 120° conduction control employed in which a constant current is caused to flow normally in series in the armature coils of two-phases out of three-phases.

FIG. 2 is a diagram showing one example of a control circuit employing a 120° conduction control method and FIG. 3 is a graph showing waveforms of the signals at various portions in the FIG. 2 diagram. A current IU flowing through the armature coils $u_1$ and $u_2$, a current IV flowing through the armature coils $v_1$ and $v_2$ and a current IW flowing through the armature coils $w_1$ and $w_2$ assume waveforms of conduction and interruption at every 120° in terms of the electrical angle due to on/off control of the respective transistors Q34 to Q36 and Q25 to Q27.

However, control is made such that the armature current IA being a total of two out of currents IU, IV and IW may be normally constant. At that time, the voltage $V_{UO}$ between the terminals U and O and the voltage $V_{UV}$ between the terminals U and V are each a sum of a counterelectromotive force CEF of the armature and the voltage drop $V_{DP}$ due to the resistance of the armature coils. According to the above described 120° conduction control method, in principle approximately a 13% torque ripple is involved on the occasion of a normal state in which a sinusoidal counterelectromotive force is induced in the armature coil and the same cannot be neglected although practically it is of a less problem. Furthermore, since conduction control of the armature coils is on/off control, it is necessary to provide a filter including a relatively large capacitor to voltage applying terminals of the armature coils of the motor. Referring to FIG. 2, such filter comprises a capacitor C and a resistor R. Furthermore, a slit-like instantaneous interruption of a current is likely to occur, which entails a disadvantage that a vibration and noise likely occur.

It has also been desired that a control apparatus of a transistor motor is provided in which adjustment of the outputs of the hall-effect devices or the voltages applied to the armature coils for each motor is not required and a slit-like instantaneous interruption of a current in the armature coils is suppressed without employing the above described filter.

SUMMARY OF THE INVENTION

In summary, the present invention comprises a control apparatus of a transistor motor having multiple-phase armature coils, comprising; voltage source means for providing positive and negative voltages symmetrical to each other with respect to an intermediate voltage, a plurality of sensor means, each detecting magnetic flux equivalent to magnetic flux interlinking each phase armature coil for providing detected signal; a plurality of amplifying means, each amplifying the above described detected signal for providing an electrical output for driving the motor to each armature coil; a plurality of feedback voltage generating means, each detecting an electrical quantity for driving the motor for providing the same as a feedback voltage of each phase; reference value providing means responsive to an externally provided control signal for generating a first reference value having the magnitude of a predetermined relation with respect to the magnitude of the above described feedback voltage and a second reference value of the same magnitude as that of the first reference value and of the opposite polarity to that of the first reference value, with the intermediate potential as a reference; first voltage addition means for adding the magnitude of the positive-going component with respect to the first reference value out of the peak values of the above described feedback voltages for providing a first addition output voltage; second voltage addition means for adding the magnitude of the negative-going component with respect to the second reference value out of the peak values of the above described feedback voltages for providing a second addition output voltage; third voltage addition means for adding the above described first and second addition output voltages for providing a third addition output voltage; and difference control means for controlling the magnitudes of the above described detected signals such that the magnitude of the third addition output voltage may be consistent with the magnitude of the control signal.

According to the present invention, the feedback voltage generating means provides as a feedback voltage of each phase a voltage obtained by converting the motor driving voltage or the current flowing through each phase armature coil. The first voltage addition means makes addition of the magnitude of the positive-going component with respect to the first reference value out of the peak values of the feedback voltage to provide a first addition output voltage. The second voltage addition means makes addition of the magnitude of the negative-going component with respect to the second reference value out of the peak values of the feedback voltage to provide a second addition output voltage. The third voltage addition means makes addition of the first and second addition output voltages to provide a third addition output voltage. The difference control means controls the output voltage of the sensor means such that the magnitude of the third addition output voltage may be consistent with the magnitude of the externally provided control signal. Therefore, in the case where the output voltage from the sensor means is an ideal sine waveform, a torque ripple of the motor in accordance with the present invention is slightly larger than that of the conventional apparatus. However, it can hardly be that the output voltage is of an ideal sine waveform and in such a situation it was confirmed that the torque ripple of the inventive apparatus is much smaller than that of the conventional apparatus.

Accordingly, a principle object of the present invention is to provide a control apparatus of a transistor motor in which a torque ripple is decreased without adjustment of the output from a hall-effect device of each motor or the voltage applied to the armature coils and a slit-like instantaneous interruption of a current is suppressed from occurring in the armature coils without using a filter.

A major advantage of the present invention is that a torque ripple can be drastically mitigated even if factors inherently increasing a torque ripple of a motor such as diversification, direct current offset, waveform distortion and the like are included in the respective output voltages of sensor means for detecting the magnetic fluxes interlinking the armature coils, such as hall-effect devices.

Another advantage of the present invention is that necessity of adjusting gain differences and offset differences between the respective hall-effect devices is eliminated since a torque ripple can be drastically mitigated, whereby any manual work of adjustment can be dispensed with.

A further advantage of the present invention is that since such on/off operation as a switching control is not performed and the voltages applied to the armature coils are of a sine waveform or of a trapezoidal waveform, an RC filter can be dispensed with and a noise is decreased, while the number of externally connected components can be decreased by implementing the inventive control apparatus in an integrated circuit form.

Still a further advantage of the present invention is that the ratio of a torque ripple becomes constant irrespective of the magnitude of the number of rotations of the rotor.

Still another advantage of the present invention is that since the apparatus is of a voltage control type when the voltages applied to the armature coils are used as a feedback voltage, the response is quick and the stability and servo characteristic are excellent.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a graph showing waveforms of the electrical signals at various portions of the FIG. 2 diagram;

FIGS. 4A and 4B are views showing one example of a three-phase transistor motor in which the inventive control apparatus can be employed, wherein FIG. 4A is a plan view of a stator portion of the motor and FIG. 4B is a sectional view taken along the line A—A in FIG. 4A;

DESCRIPTION OF THE PREFERRED EMBODIMENTS

Figure 1:
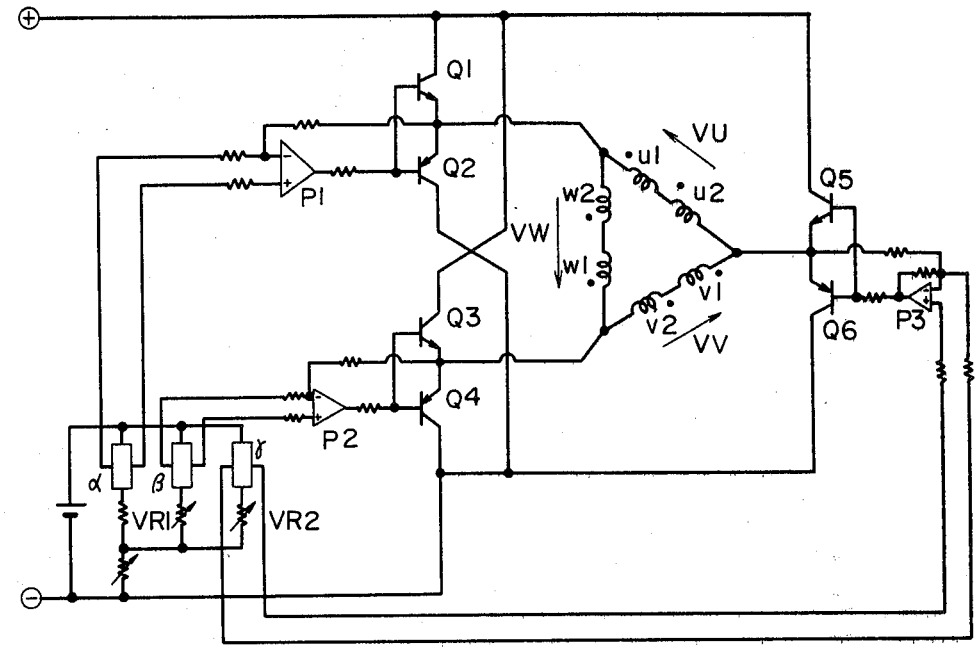
FIG. 1 is a schematic diagram showing one example of a conventional control circuit employing a linear type.
Figure 2:
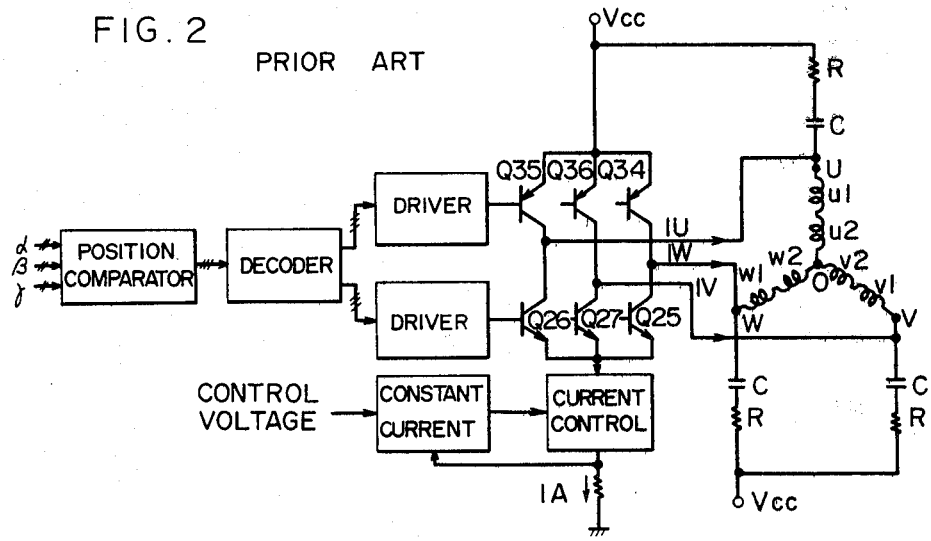
FIG. 2 is a diagram showing one example of a conventional control circuit employing a 120° conduction control method.
Figure 4A:
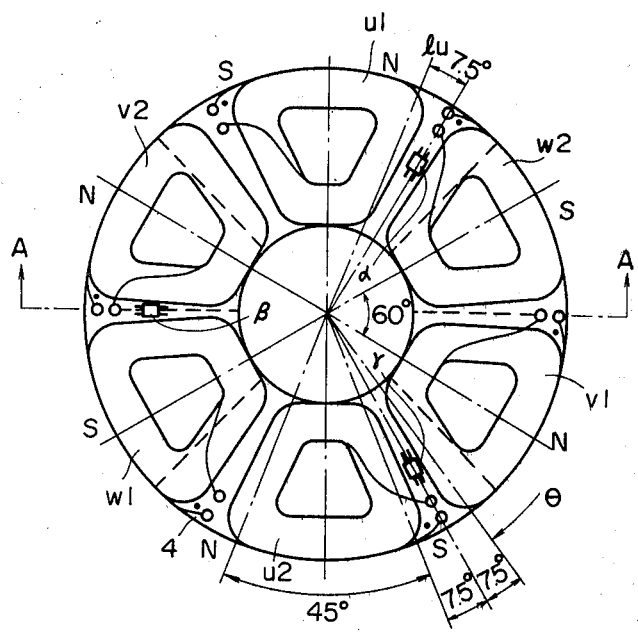
Figure 4B:
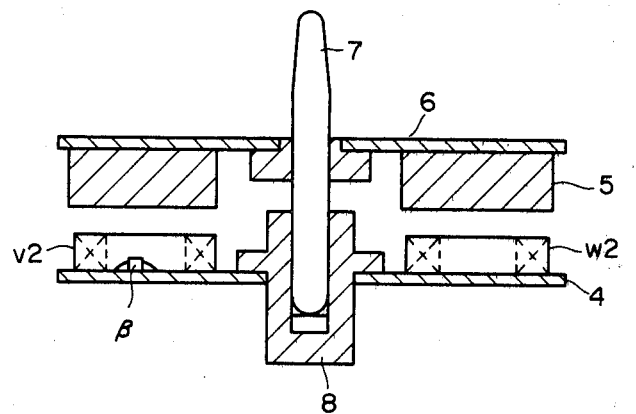

FIGS. 4A and 4B are views showing one example of a three-phase transistor motor in which the inventive control apparatus can be embodied. Specifically, FIG. 4A is a plan view of a stator portion of the motor. The FIG. 4A stator comprises six armature coils $u_1$, $u_2$, $v_1$, $v_2$, $w_1$, and $w_2$ each comprised of a number of turns of a thin conductive wire, arranged at the pitch of the mechanical angle of 60°, wherein each pair of axis-symmetrical coils $u_1$ and $u_2$; $v_1$ and $v_2$; and $w_1$ and $w_2$ are each connected in series, so that the coils of the u, v and w phases may be formed. Each coil is fan-shaped so that both sides are formed to be spaced apart from each other by approximately 180° (approximately 45° in terms of the mechanical angle). A hall-effect device $\alpha$ is placed at the center between the windings $u_1$ and $w_2$, so that the same may be positioned at the position dislocated by approximately 7.5° in terms of the mechanical angle (by approximately 30° in terms of the electrical angle) in the rotor rotational direction from the position of the u phase winding which is to be controlled. Hall-effect devices $\beta$ and $\gamma$ are also similarly disposed at the similar positions as described above with respect to the v and w phase windings which are to be controlled. Accordingly, it follows that there is a phase difference of 120° in terms of the electrical angle between the differential outputs of the respective hall-effect devices. FIG. 4B shows a sectional view taken along the line A—A in FIG. 4A and also shows a sectional view of the rotor. A rotational disk 6 fixed to a rotational shaft 7 is provided with eight poles of ring-shaped permanent magnets 5 magnetized in the axial direction and disposed at the equal pitch of 45° in terms of the mechanical angle in the peripheral direction. A magnetic plate 4 forming a major portion of the stator is integrally fixed to a bearing 8 rotatably supporting the rotating shaft 7 and the above described armature coils $u_1$ to $w_2$ and the hall-effect devices $\alpha$ to $\gamma$ are fixed thereon.

Figure 5:
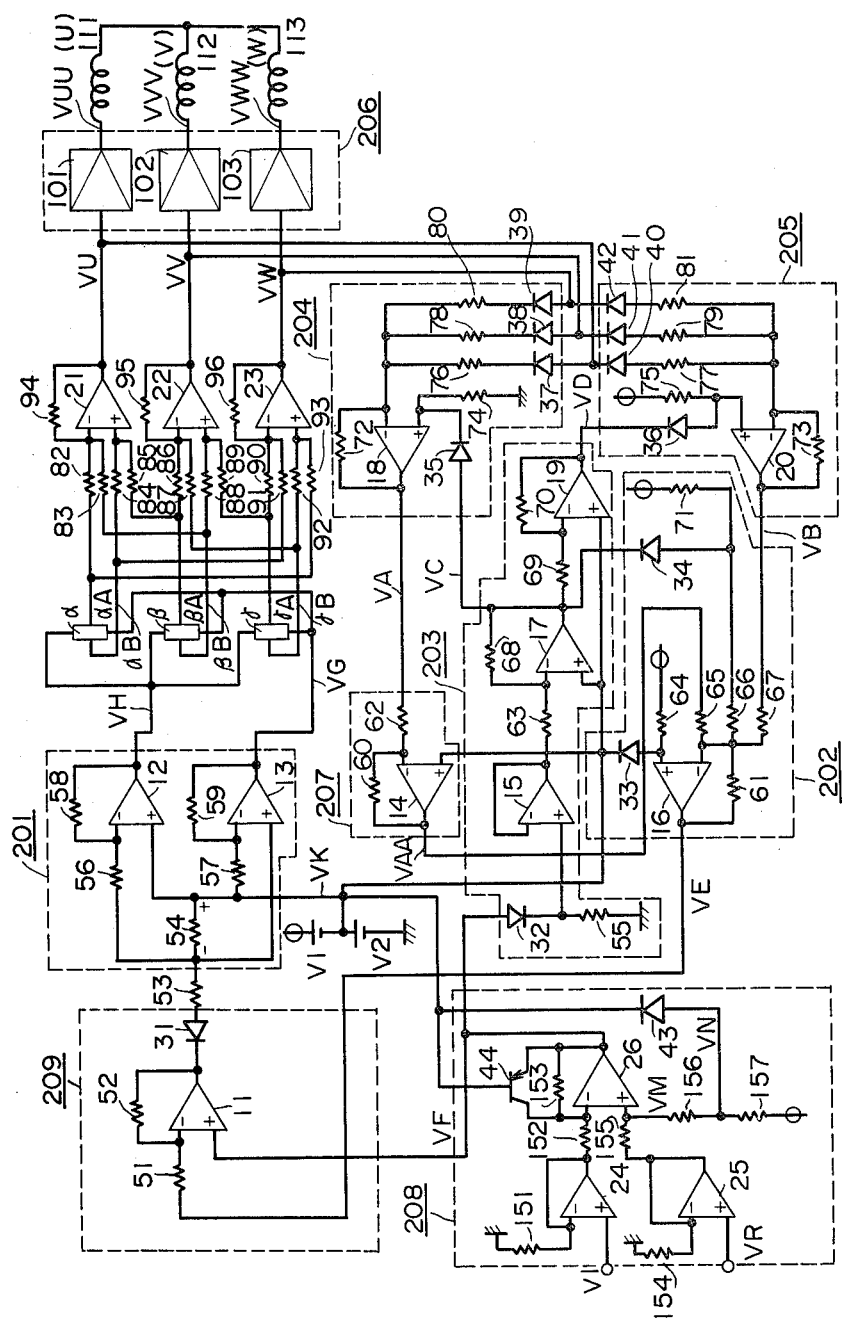
FIG. 5 is a schematic diagram of one embodiment of the present invention.

FIG. 5 is a schematic diagram of one embodiment of the present invention. Referring to FIG. 5, the reference numerals 111, 112 and 113 denote the armature coils of the u, v, and w phases of the above described motor. The negative input terminal of a linear amplifying circuit 21 is connected to the output terminal $\alpha A$ of the hall-effect device $\alpha$ and the output terminal $\beta B$ of the hall-effect device $\beta$ through resistors 82 and 83 of the same resistance value, respectively. Likewise, the positive input terminal of the linear amplifying circuit 21 is connected to the output terminals $\alpha B$ and $\beta A$ of the hall-effect devices $\alpha$ and $\beta$ through resistors 84 and 85 of the same resistance value, respectively. Similarly, the output terminals $\beta A$, $\gamma B$ and $\beta B$, $\gamma A$ of the hall-effect devices are connected to the negative and positive input terminals of the linear amplifying circuit 22 through resistors 86, 87 and 88, 89 and the output terminals $\gamma A, \alpha B$ and $\gamma B, \alpha A$ of the hall-effect devices are connected to the negative and positive input terminals of the linear amplifying circuit 23 through resistors 90, 91 and 92, 93, respectively. At that time the output voltage VU of the linear amplifying circuit 21 becomes a value obtained by amplifying a difference voltage between the sum of the output voltages of the output terminals $\alpha A$ and $\beta B$ of the hall-effect devices and the sum of the output voltages of the output terminals $\alpha B$ and $\beta A$ of the hall-effect devices with the gain determined by the resistors 82, 83, 84, 85 and 94. The output waveform becomes the one of the phase advanced by 30° in terms of the electrical angle as compared with that of the output voltage between the output terminals $\alpha A$ and $\alpha B$ obtained at the hall-effect device $\alpha$. On the other hand, the output voltage between the above described output terminals $\alpha A$ and $\alpha B$ is lagged by 30° in terms of the electrical angle with respect to a counter-electromotive force induced in the winding on the line lu of the U phase winding in view of the fact that the position of the hall-effect device $\alpha$ has been shifted in the rotational direction of the rotor by 7.5° in terms of the mechanical angle (by 30° in terms of the electrical angle) as compared with the line lu of the above described U phase winding. Accordingly, the above described output voltage VU becomes of the same phase as that of the couterelectromotive force induced in the U phase winding and the same is equivalent to a situation in which the hall-effect device $\alpha$ is placed on the above described line lu or at the position dislocated by 360° in terms of the electrical angle as compared with the line lu. Similarly the output voltages VV and VW of the linear amplifying circuits 22 and 23 become of the same phase as that of the counterelectromotive force induced in the V and W phase windings, respectively. It is pointed out that the resistance values of the respective resistors 82 to 96 are set such that the gains of the linear amplifying circuits 21 to 23 may all be the same. The reference numeral 206 denotes a power amplifying circuit, which is inserted between the above described linear amplifying circuits and the armature coils when it is desired to obtain a large power output. In the case where a motor not requiring a large power is to be connected to the control apparatus, (in such a case) the circuit 206 may be omitted. In such a case, the output voltages becomes a relation of VU=VUU, VV=VVV, and VW=VWW and the outputs of the above described linear amplifying circuits 21, 22 and 23 may be directly connected to the armature coils. The reference numeral 201 denotes a voltage setting circuit, which mainly comprises amplifiers 12 and 13 of ample gain and serve to control an input voltage applied to the hall-effect devices.

The voltage source of the control apparatus comprises voltage sources V1 and V2 which are connected in series. The same is structured such that, assuming that the potential at the junction of the voltage source V1 and V2, i.e. an intermediate potential of the voltage source is VK, positive and negative output voltages VH and VG of the voltage setting circuit 201 as viewed from the VK potential may appear as positive and negative symmetrical voltages. In other words, the positive voltage of the value proportional to the voltage drop in the direction shown in the figure of a resistor 54 is obtained as the value of VH by resistors 56 and 58 and an amplifier 12 and similarly the negative voltage is obtained as the value of VG by means of resistors 57 and 59 and an amplifier 13. Without the voltage drop across the resistor 54, both the potentials VH and VG become equal to the potential of VK. The respective voltages VH and VG become the terminal voltages of the input terminals to which the hall-effect devices $\alpha$, $\beta$ and $\gamma$ are connected in parallel. Since a direct current potential at the differential output terminals of the hall-effect device is normally obtained as a value of a half of the input terminal voltage, the differential output voltage of the hall-effect device becomes approximately a positive/negative symmetrical one with the intermediate value VK of the voltage source as the center. Without the voltage drop across the resistor 54, the direct current potentials of the respective differential outputs of the hall-effect devices are all a constant value of the value VK. Accordingly, the outputs of the linear amplifying circuits 21, 22 and 23 are also a constant value of VK in terms of the direct current and therefore the voltages applied to the respective armature coils are equal and no current flows through the armature coils, whereby no rotational force is applied to the motor.

The values of the voltages VU, VV, VW (the input voltages to the power amplifying circuit 206 in the case where a large power is required) applied to the armature coil 111, 112 and 113 are the input signals to the positive voltage addition circuit 204 and the negative voltage addition circuit 205, i.e. the feedback signal of the control apparatus. The positive voltage addition circuit 204 receives the value higher than the first reference value VC out of the values of the above described voltages VU, VV and VW through the diodes 37, 38 and 39, thereby to convert these voltages to current values by means of the resistors 76, 78 and 80 of the equal value. At that time, the diodes 37, 38 and 39 are required to select one or more of the values more positive than the reference value VC but it follows that the above described voltages VU, VV and VW are decreased by a diode forward voltage due to a voltage drop across these diodes. Accordingly, in order to cancel these, the reference value VC is connected to an operational amplifier 18 through a diode 35. By doing so, the diode 35 cancels the forward voltages of the diodes 37, 38 and 39 and at the same time cancels a temperature variation thereof. Meanwhile, the value of the first reference value VC is a value in the positive direction as viewed from the intermediate value VK of the voltage source and is produced by an addition reference setting circuit 203 to be described subsequently based on a control signal VI which is a setting signal provided externally to the FIG. 5 apparatus. A sum of those having values higher than the above described value of VC out of the feedback signals VU, VV and VW is obtained as the output voltage VA of the positive voltage addition circuit 204 by means of the operational amplifier 18 and the resistor 72. The value thereof is obtained as a negative value with the polarity reversed, when viewed with the above described value of VK as the center. The negative voltage addition circuit 205 is in a complementary relation with respect to the positive voltage addition circuit 204. The diodes 40, 41 and 42 taking in the input signals VU, VV and VW and the diode 36 are of the opposite polarity as compared with those corresponding ones in the positive voltage addition circuit 204. The first reference value VC which became a reference in determining the positive value in the positive voltage addition circuit 204 is replaced by a value VD which is the second reference value of the negative value in the negative voltage addition circuit 205. The value VD is also produced by the addition reference setting circuit 203 to be described subsequently as done for the value VC; however, the values VC and VD are positive/negative symmetrical when viewed with the intermediate value VK of the voltage source as the center. Accordingly, as the output voltage of the negative voltage addition circuit 205 the value of the sum of the value lower than the above described value VD out of the input signals VU, VV, and VW is obtained as the positive value with the polarity converted when viewed with the value VK as the center. The reference numeral 207 denotes a polarity inverting circuit, in which it is adapted such that the output voltage VAA is the one obtained by converting the output voltage VA of the positive voltage addition circuit 204 to the positive value with the polarity reversed when the value VK is viewed as the center.

Referring to FIG. 5, the reference numeral 202 denotes a positive/negative voltage addition circuit, which makes addition of the output voltage VAA of the above described polarity inverting circuit 207 and the output voltage VB of the negative voltage addition circuit 205. Now it is assumed that one of the respective voltages VU, VV and VW is larger than the intermediate value VK of the voltage source by the value VO and another one is smaller than the intermediate value VK by the value VP. Assuming that the values of the resistors 76 to 81 are all R1 and the values of the resistors 72 and 73 are R2, then the above described values VAA and VB can be expressed in the following manner:

$$VAA = \frac{R_2}{R_1}(VO - VS) - VS + VT \quad (1)$$

where VS represents an absolute value of the voltages VC, VD serving as a reference of comparison, as viewed from VK, in feeding back the output voltage, and VT denotes a threshold voltage of the diodes 35 to 42:

$$VB = \frac{R_2}{R_1}(VP - VS) - VS + VT \quad (2)$$

Now assuming VE' in the case where only the sum of the above described two equations is simply obtained with respect to the output VE of the positive/negative voltage addition circuit 202, the output VE' may be expressed by the following equation, when the values of the resistors 65 and 67 are assumed to be R3 and the value of the resistor 61 is assumed to be R4:

$$VE' = -\frac{R_4}{R_3}\left\{\frac{R_2}{R_1}(VO - VS) + \frac{R_2}{R_1}(VP - VS) - 2VS + 2VT\right\} \quad (3)$$

The FIG. 5 apparatus is adapted such that automatic control is made so that the value of the equation (3) may be inherently equal to a predetermined set value; however, it is difficult to make such automatic control with 2VS in the third term and 2VT in the fourth term in the equation (3) and in order to remove 2VT in the fourth term the diode 33 is provided at the positive input stage of the amplifier 16. As a result, the potential higher than the intermediate value VK of the voltage source by a single diode, i.e. a voltage of VT becomes a reference potential of operation in the output of the positive/negative voltage addition circuit 202.

In order to remove 2VS in the third term, the diode 34 for shifting the threshold voltage of the diode 33 is first provided and then the resistor 66 is provided so that addition is made to the negative input side of the amplifier 16. The above described value VS as viewed from the negative input terminals of the amplifier 16 has been additionally added to the above described values VAA and VB by the negative value in terms of the direct current voltage. Accordingly, it follows that the output of the amplifier 17 to be added through the resistor 66, i.e. the value VS is added to the negative input terminal of the amplifier 16 by the positive value. If and when the value of the resistor 66 is a half of the value of each of the resistors 65 and 67, then the value 2VS in the third term in the above described equation (3) can be deleted. Thus, a sum of two sets of the absolute value of one or two of the voltages VU, VV and VW larger than the value VC being the first reference value and the absolute value of one or two of the voltages VU, VV or VW smaller than the value VD being the second reference value appears at the output VE of the positive/negative voltage addition circuit 202, in which the reference potential is a potential higher by the value commensurate with a single diode than the intermediate value VK of the voltage source.

The reference numeral 208 denotes a control signal converting circuit, which comprises a circuit for providing a voltage proportional to a difference between a reference command signal VR applied from the exterior to the inventive apparatus and a control signal VI (a value corresponding to VI−VR in case of VI>VR). The amplifiers 24 and 25 serve as buffers and, if and when VR>VI, the transistor 44 serves to suppress the output of the amplifier 26, i.e. the output VF of the control signal converting circuit 208 to a value higher than the intermediate value VK of the voltage source by a value commensurate with a single diode. The purpose of the same is to make the output VE equal to the level of the direct current component of the output VF. The difference amplifying circuit 209 functions such that a difference between the value of VF and the output VE of the above described positive/negative voltage addition circuit may be normally almost zero. The two inputs VF and VE of the difference amplifying circuit are accordingly processed with a potential higher than the intermediate value VK of the voltage source by a value commensurate with a single diode as a reference of the operation. The difference amplifying circuit 209 makes comparison of the values VF and VE, thereby to make automatic control such that the output voltage VE of the positive/negative voltage addition circuit 202 may be consistent with the value of the voltage VF lower than the intermediate value VK of the voltage source. In other words, the potential VF decreases with an increase of the control signal VI and, while the output voltage of the circuit of the difference amplifying circuit 209 decreases, a voltage drop across the resistor 54 in the voltage setting circuit 201 increases through the diode 31 and the resistor 53. The voltage applied to the hall-effect device increases in accordance with the above described change and as a result the absolute value of the alternating current component of each of the output voltages VU, VV and VW of the FIG. 5 diagram increases. The above described increase is detected as an increase in the absolute value of the outputs of the positive voltage addition circuit 204 and the negative voltage addition circuit 205 and decreases the value of the output voltage VE of the positive/negative voltage addition circuit 202. Conversely, as the value VF increases in accordance with the decrease of the control signal VI, the value VE also increases and the absolute value of the alternating current component of each of the output voltages VU, VV and VW decreases. Thus, the output voltages VU, VV and VW of the magnitude proportional to the control signal VI which is an input to the inventive apparatus is obtained by the difference amplifying circuit 209.

Referring to FIG. 5, the reference numeral 203 denotes an addition reference setting circuit, which comprises a circuit for producing the first and second reference values VC and VD serving as a reference for detecting the magnitude of the amplitude of the input voltages, i.e. the output voltages VU, VV and VW of the inventive apparatus, in the positive voltage addition circuit 204 and the negative voltage addition circuit 205. The reference value VC is produced based on the reference voltage VF with a gain associated with the difference between the values of the resistors 63 and 68 and the reference value VD becomes a value folded of the reference value VC with respect to the value VK. In other words, the values of the resistors 69 and 70 are equal to each other. The reference of operation of the said voltage VF is higher than the value VK by a value commensurate with a single diode. However, the output voltages (VU and the like) are adapted to have the same reference voltage by means of the diode 32 inasmuch as the same changes with VK as the center.

Meanwhile, in order to evaluate a torque of the motor, the counterelectromotive force induced in the armature coil is subtracted from the voltage applied to the armature coil and the thus obtained value is divided by the resistance value of the coil. As a result, a current flowing through the coil is obtained. A torque occurring in the coil is obtained by multiplying thus obtained value of the current flowing through the coils by a magnetic flux interlinking the coil and by multiplying thus obtained product by a predetermined constant. Such torque is evaluated for each phase and then a sum is evaluated to provide a torque of the motor. In the case of the three-phase, the above described second formula is utilized, in which referring to one term of a sine waveform the contents of the square are one which is a coil current and the other which corresponds to a magnetic flux interlinking the coil of the same phase.

In the foregoing the circuit configuration of the FIG. 5 diagram and the operation thereof were described. Briefly described, the control apparatus shown in FIG. 5 functions such that a sum of the voltage higher than the first reference value VC and a sum of the voltage lower than the second reference value VD among the voltages VU, VV and VW applied to the armature coils are evaluated and control is made such that a sum of these voltages may be normally consistent with a value proportional to the control signal VI. An element to be controlled at that time is a hall-effect device serving as a position sensor.

Now description will be made of a case where the FIG. 5 control apparatus thus structured is used for control of a three-phase motor shown in FIG. 4. Let it be assumed that the permanent magnet 5 is magnetized in a sine waveform and a rotor is rotating at a constant angular speed. Let it be further assumed that at that time the voltages induced in the armature coils of the respective phases U, V, and W are of a sine waveform having the same peak value. Since the geometry and the arrangement of the armature coils can be determined in actuality with high precision in a mechanical sense, the above described assumption is nearly applicable as a matter of practice. Only a problem is a differential output of the hall-effect devices which are semiconductor devices. Such output can be maintained in a linear relation with respect to the magnetic flux interlinking the devices; however, it is difficult to make equal the peak values of the sine waveforms between the respective hall-effect devices α, β and γ due to the diversification of the quality of the products. However, in order to determine a reference value necessary for describing a fundamental operation of the present invention, first it is assumed that no distortion is involved in the sine waveform and the peak values are equal to each other. In other words, an ideal sine waveform is assumed.

Figure 6:
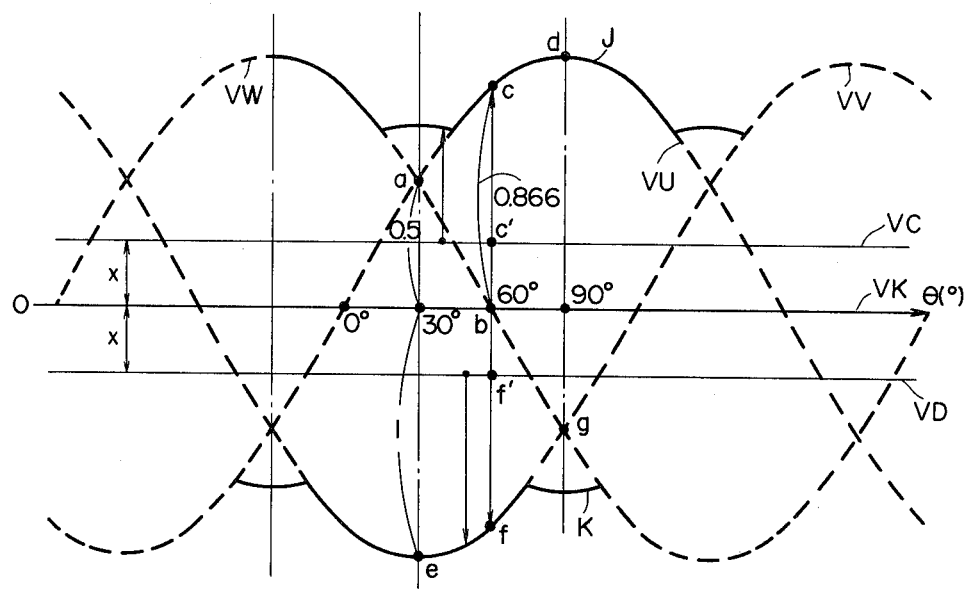
FIG. 6 is a graph showing waveforms of voltages applied to the armature coils with respect to the rotational angle $\theta$ of the rotor in the case where the output voltages of the hall-effect devices are of an ideal sine waveform.

FIG. 6 is a graph showing by the dotted line the voltages VU, VV and VW applied to the armature coils of the respective phases with respect to the rotational angle θ of the rotor in terms of the electrical angle. The direct current voltage level of the abscissa placed on the reference line represents the intermediate value VK of the voltage source in the FIG. 5 apparatus as described previously. Referring to FIG. 6, let it be assumed that the start point of the rise from zero to the positive value of the voltage VU is θ=0° and any of the respective voltages VU, VV and VW are of an ideal sine waveform. Assuming that the positive peak value of these sine waves is +1, it follows that the first reference value VC of the positive voltage addition circuit 204 in FIG. 5 corresponds to +x as viewed from VK and accordingly the second reference value VD of the negative voltage addition circuit 205 corresponds to −x as viewed from VK.

Although a description will be made in the following of a method for evaluating the above described value x, for simplicity of description consider a case where the resistance value R1 of the resistors 76 to 81 and the resistance value R2 of the resistor 72 and 73 are equal and the resistance value R3 of the resistors 65 and 66 and the resistance value R4 of the resistor 61 are equal to each other. Assuming that the value of the result by making evaluation by deeming the potential VK as a zero potential out of the output voltage VA of the positive voltage addition circuit 204 at the point of θ=30° is a, the potentials at the a point where the potentials VU and VW both become equal is added to with the potential VC as a reference, whereupon the polarity is inverted and, therefore, the result is expressed by the following equation (see the equation (1)):

$$a = -(0.5-x+0.5-x) = -1+2x \quad (4)$$

The value B of the result similarly evaluated with respect to the output voltage VB of the negative voltage addition circuit 205 is obtained by evaluating the e point potential of the voltage VV based on the reference voltage VD and by reversing the polarity and therefore the result may be expressed in the same manner as the equation (4) by the following equation (see equation (2)):

$$B = -(-1+x) = 1-x \quad (5)$$

Accordingly, the output VE of the positive/negative voltage addition circuit 202 in FIG. 5 is obtained as a value of an inversion of the polarity of the above described equation (4) plus the equation (5), in other words, as a value obtained by subtracting the equation (4) from the equation (5) and the value thereof E is expressed by the following equation (see the equation (3)):

$$E = 2-3x \quad (6)$$

Now at the point of θ=60°, the positive voltage addition circuit 204 evaluates the value at the point c of the voltage VU and the negative voltage addition circuit 205 evaluates the value of the f point of the voltage VV. By evaluating the same value E as that of the equation (6) with respect to the output voltage VE of the positive/negative voltage addition circuit 202 based on the respective output values VA and VB of these positive voltage addition circuit 204 and the negative voltage addition circuit 205, the following equation is obtained.

$$E = 0.866 \times 2 - 2x = 1.732 - 2x \quad (7)$$

Since automatic control is made in the FIG. 5 control apparatus such that the value of the output VE may be normally consistent with the value of the output VF, the values of the above described equations (6) and (7) must be equal to each other and therefore the following equation is obtained.

$$2-3x = 1.732-2x$$

$$x = 0.268 \quad (8)$$

In other words, the absolute value x of the values VC and VD serving as a reference of evaluation of the positive voltage addition circuit 204 and the negative voltage addition circuit 205 may be set to 26.8% of the peak value of the output voltages VU, VV and VW. This value is obtained by properly setting the values of the resistors 63 and 68 in the addition reference setting circuit 203 in FIG. 5. The value VF determined corresponding to the control signal VI, as described above, is equal to the above described value VE and this value is also E. The above described output value VF becomes 1.196, when the value x of the above described equation (8) is substituted in the equations (6) and (7). Accordingly, a desired value x is normally obtained, if and when the following relation is met:

$$\frac{\text{Value of Resistor 63}}{\text{Value of Resistor 68}} = \frac{1.196}{0.268} = K \quad (9)$$

where K is a constant. However, this is a case where evaluation is made with a ratio of 1 to 1 with respect to the output voltages VU, VV and VW in all of the positive voltage addition circuit 204, the negative voltage addition circuit 205 and the positive/negative voltage addition circuit 202. More specifically, as described previously, it is a case where the resistance value R1 of the resistors 76 to 81 and the resistance value R2 of the resistors 72 and 73 are equal and the resistance value R3 of the resistors 65 and 66 and the resistance value R4 of the resistor 61 are equal. If and when evaluation is to be made at the ratio say 1 to 10, i.e. assuming that the above described resistance value R2 is as large as ten times the resistance value R1 and the resistance value R4 is as large as 10 times the resistance value R3, it is necessary to multiply the value of the constant K of the above described equation (9) by a value, say 1/10, in reverse proportion to the above described ratio.

In the case of θ=90°, the d point of the voltage VU in FIG. 6 is subjected to evaluation in the positive voltage direction circuit 204 and the point g of the voltages VV and VW is subjected to evaluation in the negative voltage addition circuit 205, whereupon the respective addition results are obtained, in which the value E with respect to the output voltage VE of the positive/negative voltage addition circuit 202 evaluating a sum of these becomes consistent with the above described equation (6). Otherwise, the range of θ other than θ=30° to 90° becomes a repetition of that in the region of θ=30° to 90°.

By simply showing the result of the positive voltage addition with VC as a reference, a curve shown as J of the solid line in FIG. 6 is obtained and, by simply showing the result of the negative voltage addition with VD as a reference, a curve shown as K of the solid line in FIG. 6 is obtained. A polarity inversion of the curve J with respect to the potential VK serving as a reference of addition as a center is the output VA of the positive voltage addition circuit 204. Accordingly, it can be said that control is made in the FIG. 5 control apparatus such that the difference between the above described two curves J and K in FIG. 6 may be constant. If and when the voltages VU, VV and VW are all of a sine waveform and the peak values thereof are not equal to each other, the difference voltage between these curves J and K is not inherently constant. The FIG. 5 control apparatus functions to make the above described difference voltage (which is not inherently constant) be constant in a forced manner. Accordingly, even if the sine waveform voltages having the same peak value are applied to the armature coils with respect to all the voltages VU, VV and VW in a situation where a constant voltage is applied to all the hall-effect devices α, β and γ, the voltages applied to the armature coil of each phase becomes slightly distorted to become of a waveform as shown by the solid line in FIG. 7, if and when the FIG. 5 control apparatus functions in such a case. The black dotted portion represents a point which coincides with the inherent sine waveform shown by the dotted line. The point where distortion from the sine waveform of the voltage value VU at that time becomes maximum is a point of θ≈44.5°, where the distortion amount is approximately ±2.7%. Assuming that the magnitude of the distorted waveform is L1 and the magnitude of the sine waveform is L2 at the point of θ≈44.5°, the above described distortion amount may be obtained by the following equation:

$$\text{Distortion Amount} = \frac{L1 - L2}{L1 + L2} \times 100(\%)$$

This value is of a small order and, by describing the same in terms of a torque ripple of a motor, the same is approximately ±1.6% in a case of no counterelectromotive force in the motor, i.e. in the case where the motor has been locked. As is clear from the foregoing description, by making control of the ideal sine waveform voltage of the three-phase motor using the FIG. 5 control apparatus, the voltage applied to the armature coils becomes a waveform of substantially accurate sine waveform with a distortion as small as 2.7% and it would be appreciated that practically no problem is involved.

Now description will be made of a case where the output voltage of the hall-effect device is of an ideal sine waveform.

Figure 8:
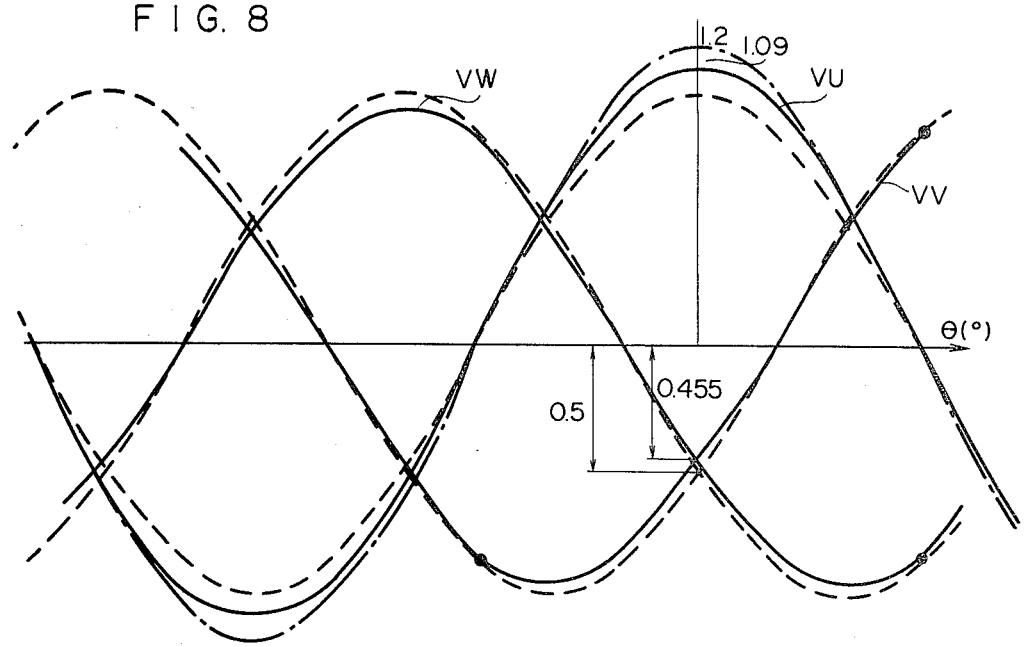
FIG. 8 is a graph showing waveforms of the voltages applied to the armature coils in the case where there are differences between the respective output voltages of the hall-effect devices.

Consider a case where only the peak value of the output of the hall-effect device α out of the hall-effect devices α, β and γ is 20% higher than those of the other hall-effect devices. Assuming that a linear type is employed in which the outputs of the hall-effect devices α, β and γ are as such amplified and the amplified outputs are applied to the armature coils, only the torque of the U-phase is larger than the other phase torque. For example, in a situation in which the counterelectromotive force is neglected (which corresponds to a state of a motor being locked), the torque ripple becomes approximately ±6.3% and in the case where the counterelectromotive force is a half of the applied voltage, the torque ripple would be approximately ±11.8%. By using the FIG. 5 control apparatus, the voltages VU, VV and VW shown by the solid line in FIG. 8 become the voltages applied to the armature coils U, V, and W, respectively. Referring to the figure, in the case of a non-controlled state, the voltage VU is not an ideal dotted line curve and such a portion as shown by one dotted line appears; however, according to the inventive control apparatus suppression is made to the position of the solid line. The voltages VV and VW are suppressed from the ideal dotted line state to the solid line state. In the figure, the numerals represent the values of the relative ratios on the occasion of suppression assuming the peak value of the ideal waveform to be the unity. At that time, the torque ripple would be approximately 3.5% in the state of a counterelectromotive force being neglected and in the case where a counterelectromotive force is a half of the applied voltage the torque ripple would become approximately 6.9%. More specifically, the torque ripple is suppressed to approximately 55% to 58% of the torque ripple on the occasion of a non-controlled state. It goes without saying that the smaller the diversification of the gains of the hall-effect devices of the numbers of three are used as a set, the smaller the torque ripple becomes; however, by using the FIG. 5 control apparatus capable of suppressing the torque ripple to 55% to 58% as compared with a non-controlled state, means need not be provided for adjusting individually the gains of the respective hall-effect devices.

Figure 9:
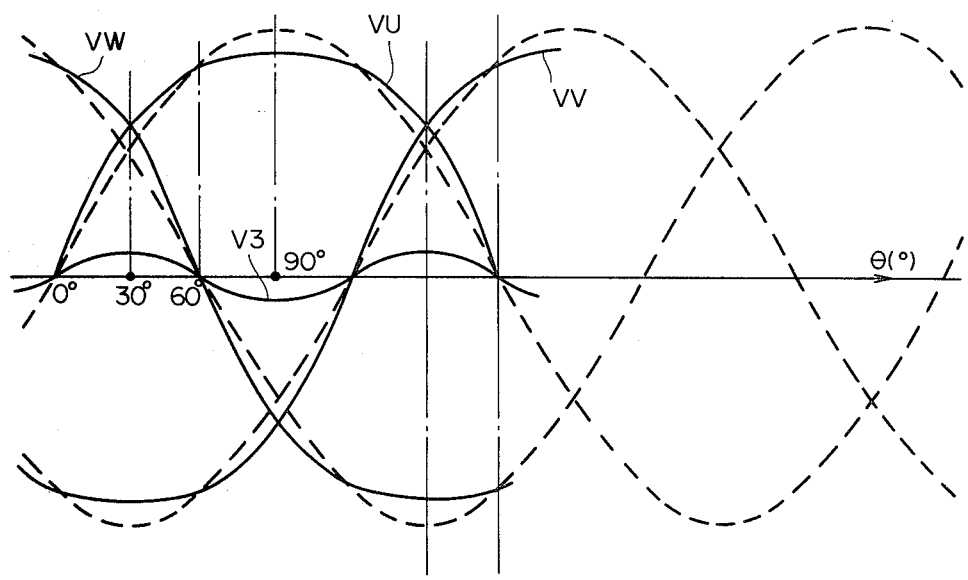
FIG. 9 is a graph showing waveforms of the voltages applied to the armature coils in the case where a third harmonic component is included in the output voltages of the hall-effect devices.

Now consider a case of a state in which the magnetic flux intersecting the hall-effect devices is not exactly a sine waveform but the peak values have been slightly suppressed. FIG. 9 shows one example of such case. More specifically, FIG. 9 shows a case including the third harmonic component having the 10% peak values with respect to an ideal sine waveform although the peak values of the outputs of the hall-effect devices α, β and γ are the same, in which these outputs are shown by the solid line as the voltages VU, VV and VW being applied to the armature coils of the respective phases U, V and W after amplification as such. The voltages VU, VV and VW are the sum of the third harmonic component V3 shown by the solid line to the respective phases with respect to the ideal sine waveform shown by the dotted line. In such a case, when the FIG. 5 control apparatus is utilized, the absolute value x of the voltages VC and VD being a reference of evaluation in the positive voltage addition circuit 204 and the negative voltage addition circuit 205 would be a value obtained by adding the ratio of the third harmonic to the fundamental wave to the value evaluated by the above described equation (8), i.e. x=0.268. In other words, in the FIG. 9 example, x=0.268+0.1=0.368. This results from the fact that the peak value of the third harmonic comes into the above described equation (6) and the value x is determined by making the same equal to the equation (7). More specifically, the above described equation (4) is expressed as −1.2 +2x and the equation (5) is expressed as 0.9−x and as a result the equation (6) become 2.1−3x. From the condition for making the equation (7)

having no influence of the third harmonic and the above described value, a relation of $2.1-3x=1.372-2x$ is obtained and therefore $x=0.368$ is obtained. Thus, depending on how much the waveform of the magnetic flux interlinking the hall-effect devices is distorted from the sine waveform, the value x is adjusted so that a point for minimizing the torque ripple can be selected. As described previously, adjustment of the value x is performed by properly setting the values of the resistors 63 and 68 in the addition reference setting circuit 203 in the FIG. 5 apparatus. Such setting work is done when the structure of a motor, i.e. the type and geometry of the motor is determined and it is not necessary to make such adjustment for each motor in the case where the motors are of the same structure and the set value may be the same. The reason is that the position and kind of the hall-effect devices and the material and shape of the permanent magnet are of the same conditions for those motors of the same shape when the type of the motors is determined and accordingly the rate of harmonic distortion of magnetic flux can be determined as almost the same. The torque ripple of the motor in this case is the same as that in case where the waveform of the voltage applied to the armature coils does not contain a harmonic distortion. The reason is that although the third harmonic is in actuality the largest distortion component, a third harmonic component of the same phase is applied to each phase in a three-phase motor and, therefore, such is cancelled with respect to each other, with the result that no torque ripple results. Furthermore, in principle an even number harmonic components little exist and the same may be neglected, while the absolute values of the fifth and seventh harmonic components become small as the ordinal number of the component increases such that the same may also be excluded from consideration. Meanwhile, although a detailed calculation process is omitted, in the case where the peak value of the third harmonic is contained by 10% with respect to the peak of the fundamental wave, a waveform distortion would become approximately ±3.86% according to the FIG. 5 control apparatus and are larger as compared with an ideal sine waveform but the torque ripple is approximately ±1.8% and remains the same as in the case of an ideal sine waveform.

Figure 10:
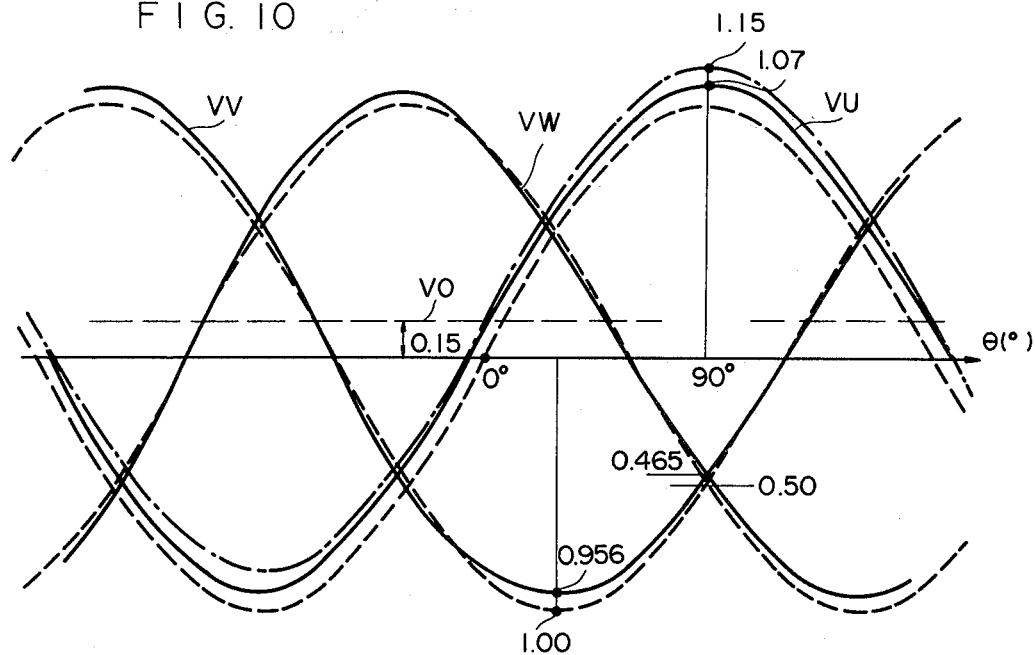
FIG. 10 is a graph showing waveforms of the voltages applied to the armature coils in the case where a direct current offset is included in the output voltages of the hall-effect devices.

Furthermore, now consider a case where an offset voltage, i.e. a deviation in a direct current potential exists only in the voltage VU. The waveforms of VU, VV and VW shown by the solid line in FIG. 10 represent the waveforms of the voltages applied to the respective armature coils of the U, V and W phases in the FIG. 5 control apparatus. In such a case, an ideal sine waveform is shown by the dotted line in each phase, whereas an offset voltage VO going in the positive direction by 15% of the peak value is involved only in the U-phase as shown by the one dotted line. The numerals in the figure show the values relatively with the peak value of the ideal sine waveform deemed as the unity. A manner of change in the voltages applied to the respective phases to compensate for an offset appearing in the U-phase is shown by the solid line; however, in the case where the torque at the point of $\theta=90°$ in a state of no offset is assumed to be 100, the torque changes from approximately 105.1 to 97.3 if and when an offset of 15% is involved in one phase. However, this is a case where a counterelectromotive force is neglected and, assuming a case where a counterelectromotive force of a half of the applied voltage exists, the torque changes from approximately 110 to 95. In any case, even if an offset of 15% exists, the torque ripple can be suppressed to approximately ±3.8%.

In the foregoing description the value VC being the value more positive than the intermediate value VK of the voltage source was used as the first reference value of evaluation in the positive voltage addition circuit 204 and the value VD being the value more negative than the intermediate value VK of the voltage source was used as the second difference value of evaluation in the negative voltage addition circuit 205. Now this system is referred to as a PP type. However, even if replacement by each other of the respective values VC and VD is made such that the value VD is used as the above described first reference value and the value VC is used as the above described second reference value, the FIG. 5 control apparatus functions in the same manner as that before such replacement. Now this system is referred to as a PN type. More specifically, if and when at the point of $\theta=30°$ replacement is made of the sign of the value x in the above described equation (4) and the similarly replacement is made of the sign of the value x in the above described equation (5), then the result is the same as that in replacement by each other of the values VC and VD. As a result, the value E in the above described equation (6) is expressed by the following equation:

$$E=2+3x \tag{10}$$

According to the PP type, at the point of $\theta=60°$ the value of $\overline{c'b}$ and $\overline{bf'}$ in FIG. 6 (i.e. the value x) was not included in the evaluation. However, according to the PN type these values are included in the evaluation and therefore the above described equation (7) is replaced by the following equation:

$$E=0.866\times2+4x=1.732+4x \tag{11}$$

Figure 11:
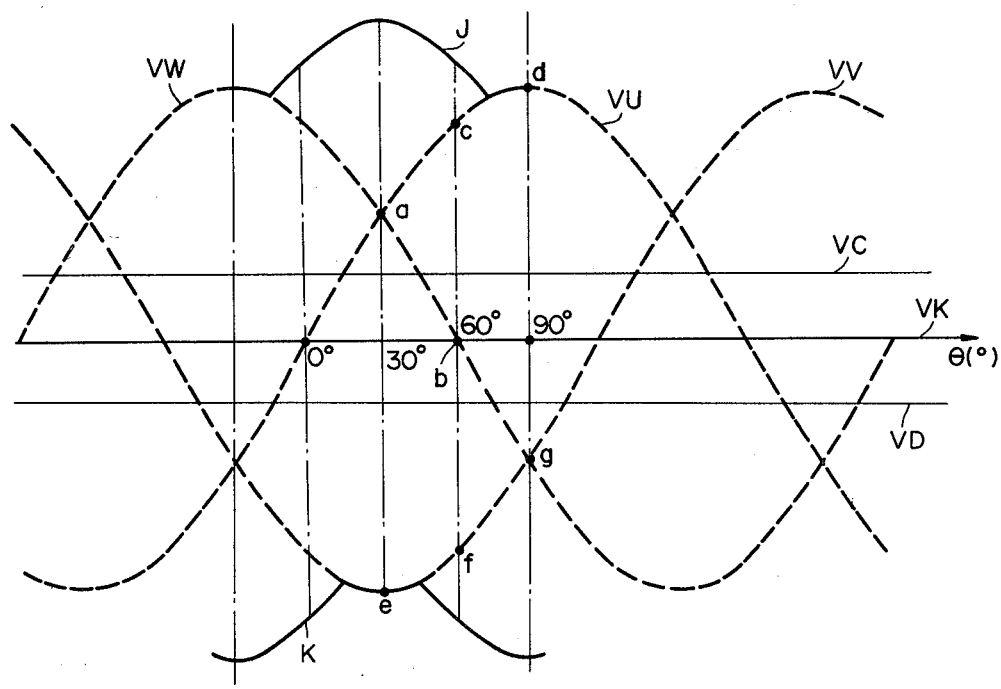
FIG. 11 is a graph showing waveforms of the voltages applied to the armature coils in the case where the control apparatus is of a PN type.

If the condition in which the above described equations (10) and (11) become equal to each other is evaluated, then the value becomes equal to the value of the above described equation (8). This is shown in FIG. 11 by the same curves J, K as those in FIG. 6, in which the respective values VC and VD may be replaced by each other. At that time the waveform distortion amount is decreased approximately to ±1.15%.

Now for clarification the reference value x and the torque ripple of the motor in the respective cases where the control system is a conventional type, and the inventive PP type and the inventive PN type, are shown in Table for each of the case where the state of the output voltage from the above described hall-effect device is an ideal sine waveform, the case where the output of only one phase is 20% larger than the others, the case where the direct current offset exists by 15% only in one phase, and the case where the third harmonic is 10% of the fundamental wave in all of the three phases. As is clear from the Table, in the case where the state of the output voltage from the hall-effect device is an ideal sine waveform, the torque ripple in the case of the inventive apparatus is slightly larger than that of the conventional type. However, as described in the foregoing, it could little happen that the output voltage of the hall-effect device be an indeal sine waveform and a diversification of the output voltage due to diversification of the gains of the hall-effect devices and a direct current offset could necessarily exist. In such case, the torque ripple in the case of the inventive apparatus is much smaller than that of the conventional apparatus.

TABLE

| State of output voltage of hall-effect device | control system | reference value x | torque ripple (%) |
|---|---|---|---|
| Ideal sine waveform | PP type | 0.268 | ±1.6 |
|  | PN type | 0.268 | ±1.6 |
|  | conventional type | — | 0 |
| Output in only one phase is 20% larger than others. | PP type | 0.268 | ±3.5 |
|  | PN type | 0.268 | ±2.9 |
|  | conventional type | — | ±6.3 |
| Direct current offset in only one phase is 15%. | PP type | 0.268 | ±3.8 |
|  | PN type | 0.268 | ±2.5 |
|  | conventional type | — | ±10.0 |
| Third harmonic is 10% off fundamental wave in all three phases. | PP type | 0.368 | ±1.8 |
|  | PN type | 0.368 | ±1.8 |
|  | conventional type | — | 0 |

Figure 12:
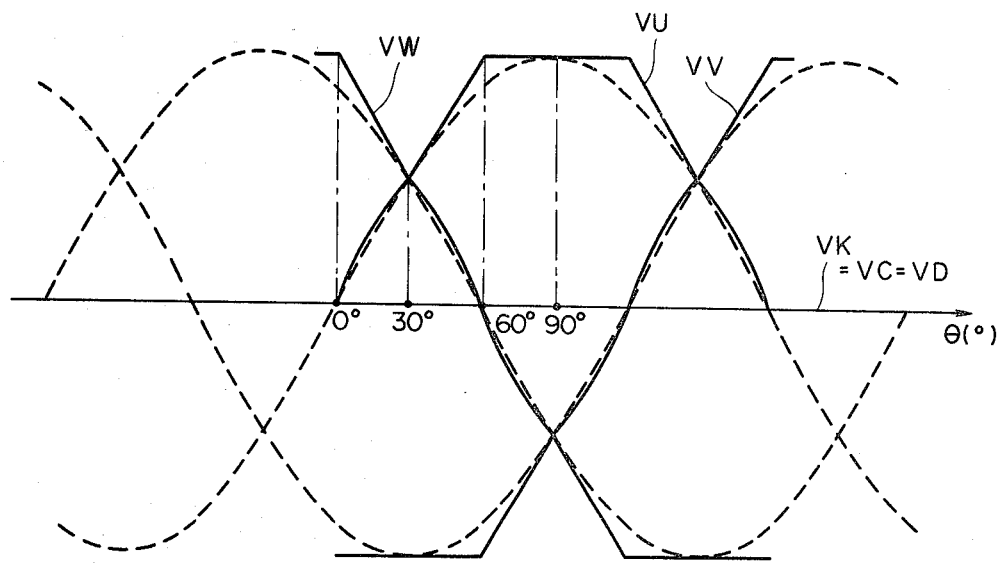
FIG. 12 is a graph showing waveforms of the voltages applied to the armature coils in the case where the first and second reference values are set to an intermediate value of a voltage source.

Meanwhile, by short-circuiting the resistor 68 in the addition reference setting circuit 203 in the FIG. 5 control apparatus, the amplification factor by the amplifier 17 becomes the unity and it means that the potentials VC and VD being the first and second reference values in evaluation by the positive voltage addition circuit 204 and the negative voltage addition circuit 205 are set to a constant value being the intermediate value VK of the voltage source. More specifically, it means that the above described value x is set to zero. In such case, when the voltages VU, VV and VW applied to the armature coils of the respective phases U, V and W are viewed from VK, the same become such waveforms as shown by the solid line in FIG. 12, which means that the same is almost a so-called 60° trapezoidal wave driving. In this case, even if there are a gain difference between the outputs of the respective hall-effect devices and a difference between the offset voltages of the respective phases, a difference is caused between the respective phases at the slope portions of the trapezoidal waves, although little influence is exerted upon the torque ripple. However, the torque ripple of the 60° trapezoidal wave is not fundamentally removed and the value thereof is large as compared with the above described system in which a voltage of a sine waveform is applied. However, in the case of no counterelectromotive force, the torque ripple becomes approximately ±6.7% and in the case of a counterelectromotive force of a half of the applied voltage the torque ripple becomes approximately ±13%, which means that such are not a value of a fundamental problem. The above described 60° trapezoidal wave control is effective in the case where a motor is rotated at a relative high speed. In other words, since the frequency of the torque ripple becomes the frequency of as large as six times that of the fundamental wave, it may be considered that the frequency component thereof shifts to a sufficiently high level in a high speed motor and little influence is exerted upon a rotational irregularity. If it is desired to avoid a torque ripple having the same frequency as that of the fundamental wave being influenced by an offset and a difference in the gain of the hall-effect device, the above described 60° trapezoidal waveform driving system is effective.

Meanwhile, the magnitude of the above described reference values VC and VD, i.e. the above described value is not limited to the above described values of 0.268; 0.368 and 0. The value x may be determined in accordance with the condition of the output voltage of the hall-effect device or the type of the motor or the like within the range of 0 to 1.0. A preferred value among others is the above described value and a most preferred value is in the vicinity of 0.268.

The above described embodiment of the present invention is of a voltage control type in which the voltage applied to the armature coils of the motor is controlled. The feature of the voltage control type is that a response is quick and the stability and the servo characteristic are excellent. However, the present invention can be applied not only to a voltage control type but also to a current control type in which a current flowing into the armature coils of the motor is controlled. Now an embodiment of the current control type will be described in the following.

Figure 13:
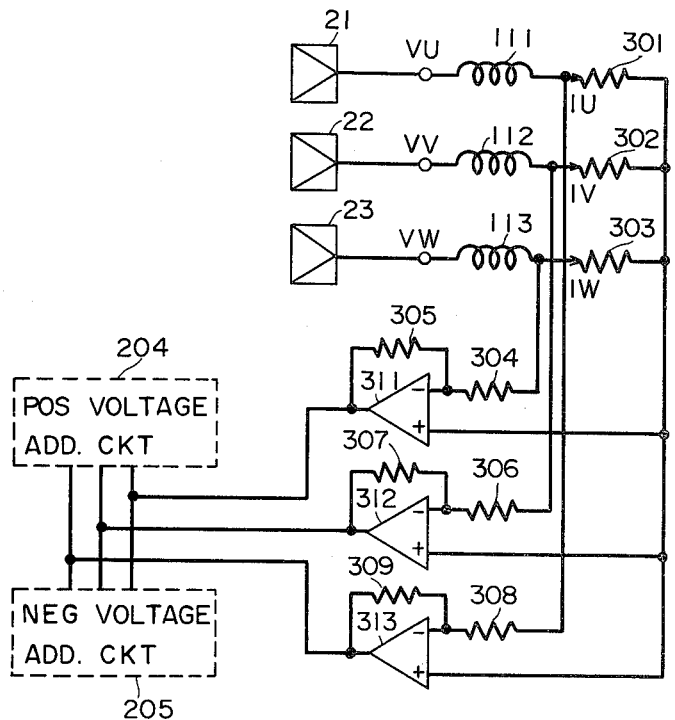
FIG. 13 is a schematic diagram showing another embodiment of a current control type.

FIG. 13 is a schematic diagram showing another embodiment of the present invention and particularly shows only a portion which is different from the FIG. 5 control apparatus. More specifically, the FIG. 5 apparatus was adapted such that by way of a feedback signal of the apparatus the voltage applied to the armature coils was applied as an input signal to the positive voltage addition circuit 204 and the negative voltage addition circuit 205, whereby such control operation was made. By contrast, the FIG. 13 apparatus is adapted such that by way of a feedback signal of the apparatus a current flowing into the armature coils is picked up and the same is applied as an input signal to the positive voltage addition circuit 204 and the negative voltage addition circuit 205. Resistors 301, 302 and 303 are added for the purpose of detecting currents flowing through the coils 111, 112 and 113 of the U, V and W phases and amplifiers 311, 312 and 313 are provided for the purpose of amplifying a voltage drop by a current flowing through each of the resistors 301, 302 and 303. The amplification factors of these amplifiers are determined by the ratio of the resistors 304 and 305, the ratio of the resistors 306 and 307 and the ratio of the resistors 308 and 309; however, by adapting such that amplification may be made up to the voltage values of the same levels as that of the applied voltages VU, VV and VW, including the resistance values of the resistors 301, 302 and 303 for detecting the currents, the portions other than those shown in FIG. 13 may be the same as those corresponding portions in the FIG. 5 apparatus. In the thus structured FIG. 13 control apparatus, the description of the operation made in conjunction with the FIG. 5 control apparatus is as such applicable if and when the output voltages VU, VV and VW are replaced by the currents IU, IV and IW flowing in the U, V and W phases.

Figure 7:
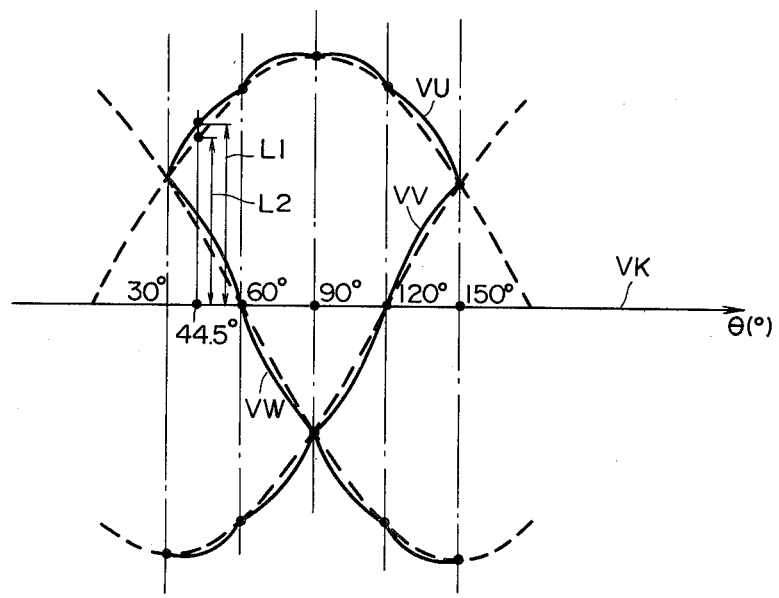
FIG. 7 is a graph showing waveforms of the voltages applied to the armature coils when the inventive control apparatus functions in the case where the output voltages of the hall-effect devices are of an ideal sine waveform.

In making a current control by the FIG. 13 apparatus and in the case where the outputs from the hall-effect devices are of a sine waveform and the peak values of the outputs of the respective hall-effect devices are the same, the waveform of the currents flowing through the armature coils of the respective phases becomes as shown by the solid line in FIG. 7. At the time, the ratio of the torque ripple is constant irrespective of the presence or absence of a counterelectromotive force and would be as small as approximately ±1.6%. However, the value of the above described equation (8) is applied for the absolute value x of the values VC and VD being a reference of evaluation in the positive voltage addition circuit 204 and the negative voltage addition circuit 205. The value of the torque ripple of the motor is as such proportional to the ratio of distortion of the waveform and the value in the case of no counterelectromotive force out of the values described in the case of making a voltage control becomes a torque ripple value of the motor and, in the case of the FIG. 13 apparatus making a current control, the feature is that this value is constant irrespective of presence or absence of a counterelectromotive force. Thus, in comparison with the FIG. 5 apparatus making a voltage control, a system of making a current control by the FIG. 13 control apparatus exhibits a constant torque ripple of the motor irrespective of presence or absence of a counterelectromotive force, which value is small. Accordingly, in the case where it is particularly desired to suppress the value of the torque ripple to be small, the FIG. 13 apparatus is excellent in spite of more or less complexity, in comparison of the FIG. 5 apparatus.

Figure 14:
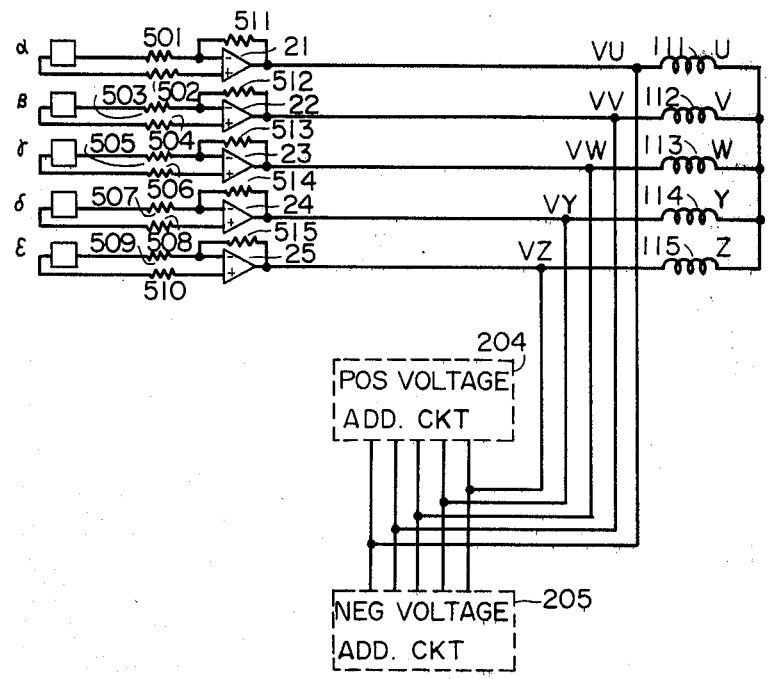
FIG. 14 is a schematic diagram showing a further embodiment in the case of a five-phase motor and of a voltage control type.
Figure 15:
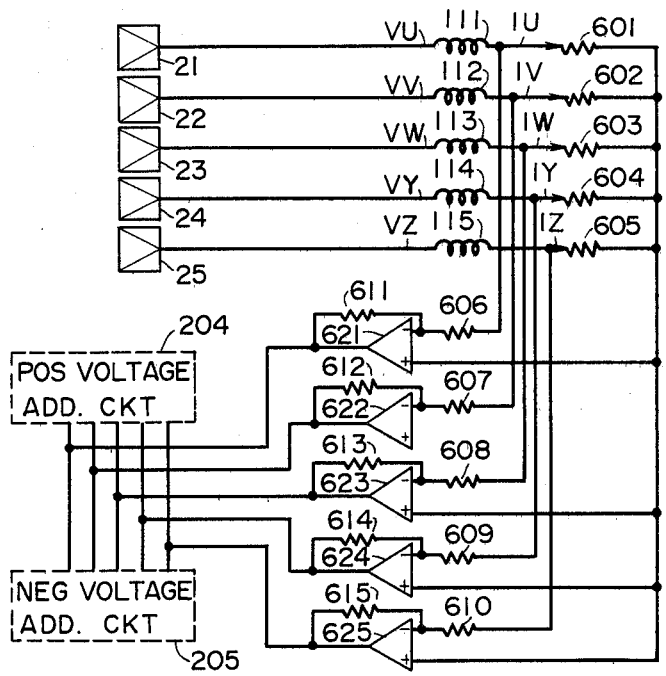
FIG. 15 is a schematic diagram showing still a further embodiment in the case of a five-phase motor and of current control type.

FIGS. 14 and 15 are examples in which the above described control methods depicted in conjunction with FIGS. 5 and 13 are applid to those other than a three-phase motor and show the embodiments of a voltage control of a five-phase motor and a current control of a five-phase motor, in which only different portions from those in the FIG. 5 control apparatus are selected and shown. Although the FIG. 5 control apparatus used the applied voltages VU, VV and VW of the U, V and W phases as a feedback signal of the control apparatus, the FIG. 14 embodiment uses five kinds of applied voltages VU, VV VW, VY and VZ as a feedback signal because of the five-phase, which are applied to the positive voltage addition circuit 204 and the negative voltage addition circuit 205. Likewise, although the FIG. 13 control apparatus was adapted to detect the currents IU, IV and IW, the FIG. 15 embodiment is adapted to detect the currents IU, IV, IW, IY and IZ. These control apparatuses aim to make control in accordance with the formula of $$\sin^2\theta + \sin^2\left(\theta + \frac{2}{5}\pi\right) + \sin^2\left(\theta + \frac{4}{5}\pi\right) + \sin^2\left(\theta + \frac{6}{5}\pi\right) + \sin^2\left(\theta + \frac{8}{5}\pi\right) = \frac{5}{2}$$

and the output of almost a perfect sine waveform can be obtained based on the operation principle described in conjunction with FIG. 5. Meanwhile, referring to FIG. 14, the hall-effect devices α to ε being the position sensors ae disposed such that the same phases are attained electrically as the counterelectromotive forces induced in the respective phases U to Z.

As is clear from the foregoing description, according to the present invention, even if there is a difference between the levels of the outputs of the position sensors or even if there is a difference in the offset, a torque ripple caused thereby is drastically suppressed and mitigated, with the result that necessity is eliminated to make adjustment of the gain difference and the offset difference between the position sensors and a control apparatus of a transistor motor of a decreased torque ripple can be provided. Furthermore, since the voltage applied to the armature coils are of a sine waveform or a trapezoidal waveform, such an on/off operation as of a switching control is not made and a filter circuit including a relatively large capacitance need not be provided at the output terminal. In addition, according to the inventive apparatus, the output of the positive/-negative voltage addition circuit proportional to the control signal VI externally provided as a setting signal can be obtained. This means that a feedback signal of the inventive apparatus, i.e. the output voltage or the output current of the inventive apparatus is obtained as a value proportional to a control signal and hence this means that the value having the term of 2VS and 2VT eliminated in the above described equation (3) is proportional to the control signal VI. Therefore, according to the inventive control apparatus, the output voltage is increased or decreased in accordance with the magnitude of the absolute value of the control signal VI externally provided as a setting signal and the ratio of distortion of the waveform or the ratio of the torque ripple is normally constant.

Meanwhile, the present invention can be applied not only to a three-phase motor but also to any types of motors of the multiple phases more than a three-phase such as a five-phase, a six-phase, a seven-phase, an eight-phase, a nine-phase and the like. In such case, as shown in FIG. 14, linear amplifying circuits of the number corresponding to the number of phases (or a half of the number of phases or two times the number of phases) are provided and diodes and resistors of the number corresponding to the number of phases are provided in the inputs of the positive voltage addition circuit and the negative voltage addition circuit, while the input signals to the linear amplifying circuits corresponding to the respective phases are provided with the hall-effect devices being the position sensors of the number that can provide the signals corresponding to the number of phases prepared. The absolute value x of the values VC and VD being the reference voltages of the positive voltage addition circuit and the negative voltage addition circuit can be properly determined in accordance with the ratio of the distortion of the position sensor signal from the sine waveform in association with the number of phases. Furthermore, it is pointed out that a motor in which the inventive control apparatus can be employed is not limited to a slotless motor of a flat type as shown in FIG. 4. A motor may be of a slot type or of a type having an air gap on a plane parallel to a rotating shaft. Furthermore, although only the hall-effect devices were treated as the position sensors in the foregoing description, any type of sensors may be employed that can detect the amount of the magnetic flux equivalent to the magnetic flux interlinking the armature coils, i.e. the amount of the magnetic flux interlinking the armature coils emanating from the permanent magnet 5 of the rotor, or the amount corresponding to the magnetic flux emanating from the magnet separately provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus of a transistor motor having multiple phase armature coils, comprising:
   voltage source means for providing positive and negative voltages with respect to an intermediate potential,
   a plurality of sensor means, each detecting magnetic flux equivalent to the magnetic flux interlinking each said phase armature coil for providing a detected signal, a plurality of amplifying means, each coupled to said sensor means and each said armature coil for amplifying said detected signal for providing an electrical output for driving said motor to each said armature coil, a plurality of feedback voltage generating means, each coupled to said armature coil for detecting the electrical quantity for driving said motor for providing the same as a feedback voltage of each said phase, reference value generating means responsive to a control signal externally provided for generating a first reference value having the magnitude of a predetermined relation with respect to the magnitude of said feedback voltage and a second reference value having the same magnitude as that of said first reference value and of the opposite polarity to that of said reference value, with said intermediate potential as a reference, first voltage addition means coupled to said feedback voltage generating means and said reference value generating means for adding the magnitude of the component in a more positive direction than said first reference value within the instantaneous values of said feedback voltages, with said first reference value as a reference, for providing a first addition output voltage, second voltage addition means coupled to said feedback voltage generating means and said reference value generating means for adding the magnitude of the component in a more negative direction than said second reference value within the instantaneous values of said feedback voltages, with said second reference value as a reference, for providing a second addition output voltage, third voltage addition means coupled to said first and second voltage addition means for adding said first and second addition output voltages for providing a third addition output voltage, and difference control means coupled to said third voltage addition means and said sensor means for controlling the magnitudes of said detected signals such that the magnitude of said third addition output voltage may be consistent with the magnitude of said control signal.

2. A control apparatus of a transistor motor in accordance with claim 1, wherein
each said sensor means is adapted to detect the magnetic flux interlinking each said phase armature coil and is disposed at the position such that the voltage of said electrical output may be of the same phase as the electromotive force induced in the corresponding armature coil.

3. A control apparatus of a transistor motor in accordance with claim 1, wherein
each said sensor means comprises a hall-effect device.

4. A control apparatus of a transistor motor in accordance with claim 1, wherein
each said feedback voltage generating means comprises means for detecting the voltage applied to each said phase armature coil for providing the same as the feedback voltage of each said phase.

5. A control apparatus of a transistor motor in accordance with claim 4, wherein
each said feedback voltage generating means comprises connection means coupled to each junction between the output of said amplifying means and said armature coil.

6. A control apparatus of a transistor motor in accordance with claim 1, wherein
each said feedback voltage generating means comprises means for detecting a current flowing through each said phase armature coil for converting the same to a voltage for providing the same as a feedback voltage of each said phase.

7. A control apparatus of a transistor motor in accordance with claim 6, wherein
each said feedback voltage generating means comprises
a resistor inserted in series with said armature coil, and
an amplifier coupled to both each of said resistor for applying a voltage produced at both ends of said resistor by a current flowing through each said armature coil.

8. A control apparatus of a transistor motor in accordance with claim 1, wherein
said first and second reference values are a positive value and a negative value, respectively, with said intermediate potential as a reference.

9. A control apparatus of a transistor motor in accordance with claim 1, wherein
said first and second reference values are a negative value and a positive value, respectively, with said intermediate potential as a reference.

10. A control apparatus of a transistor motor in accordance with claim 1, wherein
the magnitudes of said first and second reference values are within the range of 0 to 100% with respect to the magnitude of said feedback voltage.

11. A control apparatus of a transistor motor in accordance with claim 10, wherein
the magnitudes of said first and second reference values are approximately 26.8% of the magnitude of said feedback voltage.

12. A control apparatus of a transistor motor in accordance with claim 10, wherein
the magnitudes of said first and second reference values are approximately 36.8% of the magnitude of said feedback voltage.

13. A control apparatus of a transistor motor in accordance with claim 10, wherein
said first and second reference values are zero with said intermediate potential as a reference.

14. A control apparatus of a transistor motor in accordance with claim 1, wherein
said first and second voltage addition means each comprise a rectifying diode having a predetermined threshold voltage.

15. A control apparatus of a transistor motor in accordance with claim 14, wherein
said first to third addition output voltages and said control signal each have a potential higher by said threshold voltage than said intermediate potential as an operation reference potential.

16. A control apparatus of a transistor motor in accordance with claim 1, wherein
said difference control means comprises
difference voltage amplifying means coupled to said third voltage addition means for amplifying the difference voltage between the magnitude of said third addition output voltage and the magnitude of said control signal, and
voltage setting means coupled to said difference voltage amplifying means and said plurality of sensor means for providing a voltage associated with said difference voltage to said plurality of sensor means for controlling the magnitudes of said detected signals.

* * * * *